3,310,543
COPOLYMERS OF POLYFLUOROARYLNITROSO COMPOUNDS AND FLUORINATED OLEFINS

Robert Neville Haszeldine, Windyridge, Lyme Road, Disley, England; John Michael Birchall, 22 Lorna Road, Cheadle Hulme, England; and John Herbert Umfreville, 36 Skaife Road, Sale, England
No Drawing. Filed Dec. 6, 1963, Ser. No. 328,486
Claims priority, application Great Britain, Dec. 17, 1962, 47,547/62
10 Claims. (Cl. 260—92.1)

This invention relates to copolymers of fluorinated aryl nitroso-compounds and fluorinated olefinic compounds.

The formation of copolymers from perfluoroalkyl-nitroso-compounds and fluoro-olefins, and the reactions of unfluorinated aryl nitroso-compounds with certain olefins have been previously described, but there is no close parallel between the behavior and methods of preparation of fluorinated aryl nitroso-compounds (e.g. pentafluoronitrosobenzene, the preferred compound used in accordance with the present invention) and the behavior and methods of preparation of either trifluoronitrosomethane or nitrosobenzene. Indeed, it is generally true that few parallels can be drawn between the chemistry of aliphatic fluorocarbons and their derivatives and the chemistry of aromatic fluorocarbons and their derivatives. Thus, the most frequently used preparation of perfluoroalkyl nitroso-compounds involves the photochemical reaction between a perfluoroalkyl iodide and nitric oxide, but it has been found that pentafluorophenyl iodide and nitric oxide do not give a nitroso compound under photochemical conditions. Similarly, while perfluoroalkylacyl and perfluoroarylacyl nitrites can be pyrolyzed to produce the corresponding nitroso compounds in good yield (e.g. the pyrolysis of heptafluorobutyryl nitrite gives an 85% yield of heptafluoronitrosopropane) the pyrolysis of perfluoroaryl nitrites is not a good method for the preparation of the corresponding perfluoroaryl nitroso compounds.

Furthermore, although nitrosobenzene, $C_6H_5NO$, reacts with non-fluorinated olefins, it does not give copolymers. Thus, the reaction of nitrosobenzene with styrene gives N-phenyl benzaldoxime

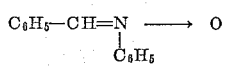

and, by further reaction of styrene with this initial product, a triphenyl isoxazolidine is produced having the formula

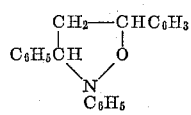

Moreover, nitrosobenzene reacts with tetrafluoroethylene to give a black powder, which apparently consists of a large number of components and is certainly not a copolymer of the two reactants resembling in any way the copolymer of this invention.

In accordance with the present invention, a polyfluoroaryl nitroso compound is reacted with a fluorinated olefin to give a good yield of a novel copolymer without appreciable byproduct formation. The novel copolymer composition of the invention comprises a copolymer wherein the repeating groups are a polyfluoroaryl nitroso moiety and a fluorinated olefin moiety in a molar ratio from 1:1 to 2:1 respectively. A preferred method of carrying out the invention is illustrated by the reaction of pentafluoronitrosobenzene with tetrafluoroethylene in a solvent to give the copolymer in excellent yield (up to 98%). The presence of a solvent (e.g., a liquid halogenated hydrocarbon such as methylene chloride, methyl chloride, chloroform, carbon tetrachloride, chlorinated ethanes, etc.) is highly desirable for this reaction. In contrast, the reaction of trifluoronitrosomethane with a fluorinated olefin is usually carried out in the absence of a solvent. Although not essential, polymerization initiators such as peroxides, azo compounds, etc., may be employed in the polymerization process. The chain length of the resulting polymer increases with increasing concentration of the reactants and, consequently, its solubility in methylene chloride or any other solvent used decreases as the concentration of the reactants is increased. Generally, polymers will be produced with molecular weights ranging from about 1000 to 2,000,000. Different conditions of polymerization can result in the production of elastomers and in polymers of varying molecular weight, and the amounts of 1:1 and 2:1 polymers produced depend upon the ratio of the reactants, although under certain conditions, both types of polymers will be obtained. The molar ratio of polyfluoroaryl nitroso compounds to fluoro-olefin which will usually be used will vary from 1:10 to 10:1. The concentration of pentafluoronitrosobenzene may vary from 0.001 to 25 mole per liter of solvent, preferably 0.01 to 10 mole per liter and particularly 0.1 to 2 mole per liter. The calculated pressure of tetrafluoroethylene above the solution may vary from 0.01 to 1000 atmospheres, preferably 0.05 to 200 atmospheres and particularly 0.1 to 20 atmospheres. The actual pressure will be less owing to the solubility of tetrafluoroethylene in the solvents such as methylene dichloride. The temperature may vary from —50 to 200° C., and the reaction time may vary from about 5 minutes to 12 months, preferably ½ hour to 6 months, and particularly 12 hours to one week. In general, reaction conditions which will lead to predominance of 1:1 copolymer will be mole ratio of nitroso compound to fluoro-olefin of 1:2 to 1:10, temperature between —50° to 200° C. (0°– 100° C. preferred) and pressures of 1–20 atmospheres. On the other hand, mainly 2:1 copolymers will be obtained under conditions of nitroso to olefin mole ratio of 10:1 to 1:2, and pressures below 1 atmosphere.

The nitroso compounds used in accordance with the invention must have fluorine atoms attached either to the carbon atoms adjacent to the position of attachment of the nitroso group, or to the nearest carbon atom capable of carrying a substituent other than carbon, and must also contain a predominance of fluorine over hydrogen on the ring carbon atoms. Expressed another way, the nitroso compounds useful in the invention will include those having the structure

where Ar is an aryl radical selected from the group of phenyl and naphthyl, Z is selected from the group consisting of hydrogen, chlorine, methyl and perfluoromethyl, $(m+n+1)$ represent an integer corresponding to the valence of Ar and $n$ is an integer of at least three. Examples of suitable nitroso compounds useful in the invention include the following:

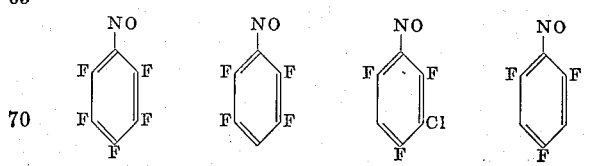

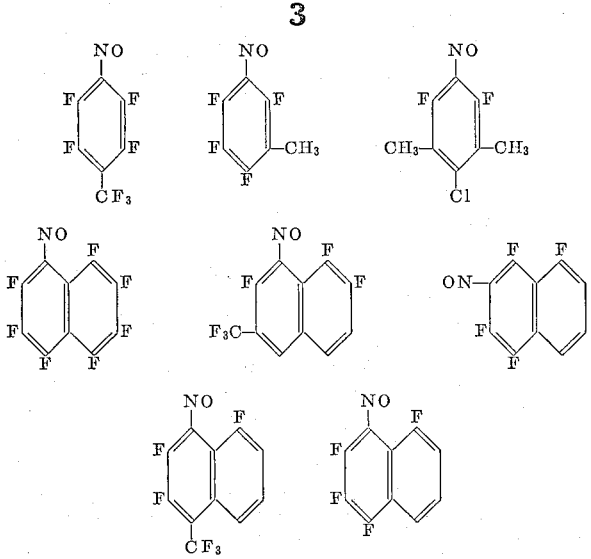

The fluoroolefin will contain from two to eight carbon atoms and will be one of the general formula $CF_2=CXY$ where X is selected from the group consisting of fluorine, chlorine and hydrogen and Y is selected from the group consisting of fluorine, chlorine, hydrogen, polyfluoroalkyl and polyfluoroaryl.

The novel copolymers of the invention may be formulated by the following structure:

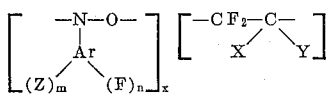

in which $x$ is an integer from one to two and where Ar, X, Y, Z, $m$ and $n$ are defined above. Thus the polymer having repeating units in a 1:1 molar ratio will have a structure such as

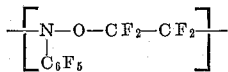

On the other hand, where the repeating units are present in the copolymer in a 2:1 ratio, the following structures are possible:

(a)

(b)

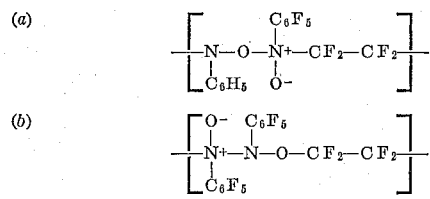

The properties of the 1:1 and 2:1 copolymers of the invention will be similar as well as different in certain respects. For example, the 2:1 polymer is more soluble in methylene chloride than a 1:1 copolymer of comparable molecular weight. This difference permits a physical separation of the two polymers from their mixture. Of course, in the same copolymer, the higher molecular weight fractions will be less soluble in any given solvent than the lower molecular weight polymers and these differences will provide a means for separation of the same polymer of different molecular weight ranges.

Nuclear magnetic resonance spectra for the low molecular weight 1:1 and 2:1 copolymers are identical and their infrared spectra differ only in that the 2:1 material indicates a band at $7.37\mu$ which appears to be due to the amine oxide grouping characteristic of this copolymer.

The following examples will serve to further illustrate the invention.

*Example 1.—Preparation of the 1:1-copolymer of pentafluoronitrosobenzene and tetrafluoroethylene*

Pentafluoronitrosobenzene (5.0 g., 0.025 mole), tetrafluoroethylene (19.0 g., 0.19 mole), and methylene chloride (25 ml.) were kept in a steel autoclave (200 ml.) at 20° C. for 4 hr. The calculated initial pressure was 24 atmospheres, and 20 atmospheres were registered on the pressure gauge. At the end of the reaction period, the unchanged tetrafluoroethylene was removed, and an insoluble pale green polymer was filtered from the methylene chloride. The green polymer was heated under reflux with methylene chloride, and then recovered as a white 1:1 copolymer of pentafluoronitrosobenzene and tetrafluoroethylene (3.1 g., 41%) [found: C, 32.2; H, 0.0. $(C_8F_9NO)_n$ requires C, 32.3; H, 0.0%], M.P. 145–165° C. (decomp.). The filtrate from the polymer separation was poured into methanol (200 ml.), and the resulting solid was filtered off to give more white 1:1 copolymer (1.73 g., 24%) [found: C, 32.5; H, 0.0%], M.P. 125–147° C. (decomp.). The first sample of the polymer was insoluble in methylene chloride, ether, acetone, benzene, chloroform, phenol, acetic acid, and perfluoropentane, but soluble in dimethylformamide and dimethylsulfoxide. Some decompositon occurred in these last two solvents. The second sample of the polymer was insoluble in methanol, but soluble in methylene chloride, acetone, and perfluoropentane. The infrared spectra of both samples using a mull film of product with a sodium chloride prism, showed the presence of pentafluorophenyl groups by bands at $6.58\mu$ (aromatic ring) and $9.99\mu$ (C–F vibrations).

*Example 2*

Pentafluoronitrosobenzene (3.2 g., 0.0168 mole), tetrafluoroethylene (4.83 g., 0.048 mole), and methylene chloride (25 ml.) were kept in a sealed Pyrex tube (260 ml.) at 20° C. until the color of the nitroso-compound was discharged (48 hr.). The calculated intial pressupre was ca. 4 atmospheres. The unreacted tetrafluoroethylene (3.34 g., 69%) was removed, and the residual mixture was filtered; the residue was dried and yielded a 1:1 copolymer of pentafluoronitrosobenzene and tetrafluoroethylene (2.30 g., 47%) [found: C, 32.5; H, 0.0; N, 4.9%. $(C_8F_9NO)_n$ requires C, 32.3; H, 0.0; N, 4.7%], M.P. 140–155° C. (decomp.).

*Example 3.—Preparation of the 2:1 copolymer of pentafluoronitrosobenzene and tetrafluoroethylene*

Pentafluoronitrosobenzene (3.22 g., 0.0164 mole) and methylene chloride (50 ml.) were placed in a 500 ml. Pyrex flask, and tetrafluoroethylene (2.01 g., 0.0201 mole) was added as a gas to the volume above the solution. The flask was stoppered and left at 20° C. for three days. The solvent was then distilled to reduce the volume of the residual solution to about 10 ml., and the residual solution was then poured into methanol (100 ml.). The precipitated polymer was filtered off, dried, and identified as a 2:1 copolymer of pentafluoronitrosobenzene and tetrafluoroethylene (1.97 g., 49%) [Found: C, 34.0; H, 0.1%. $(C_{14}F_{14}N_2O_2)_n$ requires C, 34.0; H, 0.0%], M.P. 120–132° C. The molecular weight of this polymer was about 3,500. The methanolic filtrate was evaporated to dryness and gave a brown residue of polymer (1.825 g., 45%). This was extracted with methanol to leave a cream colored insoluble residue of 2:1 copolymer (0.91 g.) [Found: C, 34.3%], M.P. 76–88°, having a molecular weight of about 1,050. The methanolic solution deposited more polymer (0.692 g.), M.P. 48–55°, when it was concentrated, and complete evaporation gave a brown residue, which was shown by infrared spectroscopy to be mainly copolymer. The total yield of polymer from this experiment was thus 94%.

FURTHER EXAMPLES LEADING TO COPOLYMERS OF PENTAFLUORONITROSOBENZENE AND TETRAFLUOROETHYLENE

Example 4

Pentafluoronitrosobenzene (0.14 g., 0.71 millimole), tetrafluoroethylene (0.074 g., 0.74 millimole), and methylene chloride (5 ml.) were kept in a 45 ml. sealed Pyrex tube at 20° C. for 5 days (calculated initial pressure about 1 atm.), until the green-blue color of the nitroso-compound was discharged. The volatile contents of the tube were removed under suction and distilled in vacuo to give unchanged tetrafluoroethylene (0.032 g., 43%), identified by molecular weight measurements and infrared spectroscopy. The pale yellow solid residue (0.172 g.) was redissolved in methylene chloride and purified by precipitation with methanol to give a white amorphous copolymer of pentafluoronitrosobenzene and tetrafluoroethylene (0.09 g., 42%, 72% based on tetrafluoroethylene transformed) [Found: C, 32.8. 1:1 copolymer requires C, 32.3; 2:1 copolymer requires C, 34.0%], M.P. 119–140° C. (decomp.).

Example 5

Pentafluoronitrosobenzene (0.18 g., 0.91 millimole), tetrafluoroethylene (0.30 g., 3.0 millimole), and methylene chloride (5 ml.) were kept in a 45 ml. sealed Pyrex tube at 20° C. for 16 hr. (total calculated initial pressure ca. 2 atm.) until the green-blue color of the nitroso-compound was discharged. The volatile contents of the tube were removed under suction and distilled in vacuo to give unchanged tetrafluoroethylene (0.23 g., 77%), identified by molecular weight measurements and infrared spectroscopy, and methylene chloride. The pale yellow solid residue (0.25 g.) was treated with methylene chloride, and the soluble portion was reprecipitated with methanol to give a white solid (0.18 g., 66%), M.P. 85–105° C., shown to be a copolymer by infrared spectroscopy. The insoluble portion (0.07 g., 26%), M.P. ca. 195° C. (decomp.), was also identified as a copolymer by infrared spectroscopy.

Example 6

Pentafluoronitrosobenzene (1.756 g., 8.90 millimole), tetrafluoroethylene (0.894 g., 8.94 millimole), and methylene chloride (5 ml.) were kept in a 45 ml. sealed Pyrex tube at 20° C. for 24 hr. (total calculated initial pressure ca. 5 atm.), until the green-blue color of the nitroso-compound was discharged. The resulting solution was poured into methanol and the precipitated polymer was filtered off, purified by dissolution in methylene chloride and reprecipitation with methanol, and dried in vacuo. It was identified as a copolymer (0.05 g., 19%), M.P. 84–106° C., by infrared spectroscopy and elemental analysis [Found: C, 33.3. 1:1 copolymer requires C, 32.3; 2:1 copolymer requires C, 34.0%]. The residue in the reaction tube, insoluble in methylene chloride, had an infrared spectrum identical with that of the soluble portion, and was also a copolymer (1.39 g., 53%) [Found: N, 5.0%. 1:1 copolymer requires N, 4.7; 2:1 copolymer requires N, 5.7%].

Example 7

Pentafluoronitrosobenzene (0.460 g., 2.34 millimole), tetrafluoroethylene (0.228 g., 2.28 millimole), and methylene chloride (5 ml.) were sealed in a 44 ml. Pyrex tube (approximate initial pressure 1.3 atm.). After two days at 20° C., the tube contained a yellow solution and a deposit of solid polymer. The latter was filtered off, dried, and identified by infrared spectroscopy as a 1:1 copolymer of pentafluoronitrosobenzene and tetrafluoroethylene (0.095 g., 18%) [Found: C, 32.5. $(C_8F_9NO)_n$ requires C, 32.3%], M.P. 130° C. (sintered 110° C.; decomposed 135° C.). The filtrate was evaporated to give a yellow solid (0.43 g., 62%), which was dissolved in methylene chloride and reprecipitated with methanol to give a white solid 2:1 copolymer of pentafluoronitrosobenzene and tetrafluoroethylene (0.08 g., 12%) [Found: C, 34.0; N, 5.6. $(C_{14}F_{14}N_2O_2)_n$ requires C, 34.0; N, 5.7%], M.P. 112° C. (sintered 85° C.; decomposed 142° C.). The infrared spectrum of this material was almost identical with that of the 1:1 copolymer, except for the presence of a band at 7.37 μ.

Example 8

Pentafluoronitrosobenzene (0.49 g., 2.57 millimole), tetrafluoroethylene (0.119 g., 1.19 millimole), and methylene chloride (5 ml.) were kept in a 43 ml. sealed Pyrex tube for 14 days (approximate total initial pressure 0.6 atm.). The tube then contained a pale green solution and a solid deposit. The latter was collected, dried, and identified by infrared spectroscopy as a copolymer (0.029 g., 4%), M.P. 130–160° C. (decomp.). The filtrate was evaporated to dryness to leave a green solid (0.475 g.), which was reprecipitated from methylene chloride with methanol and yielded a white 2:1 copolymer (0.08 g., 13%) [Found: C, 34.0; N, 5.6. $(C_{14}F_{14}N_2O_2)_n$ requires C, 34.0; N, 5.7%], M.P. 130° C. (sintered 110° C.; decomposed 135° C.).

Example 9

Pentafluoronitrosobenzene (0.417 g., 2.12 millimole), tetrafluoroethylene (0.064 g., 0.64 millimole), and methylene chloride (5 ml.) were kept in a 40 ml. sealed Pyrex tube at 20° C. for 14 days (approximate initial pressure 0.5 atm.). The tube then contained a green solution and a solid deposit. The solid copolymer (0.014 g., 2%), M.P. 140–180° C. (decomp.), was filtered off, and the filtrate was evaporated to dryness to leave a green solid (0.318 g., 51%). This was redissolved in methylene chloride and precipitated with methanol to give white 2:1 copolymer (0.04 g., 8%) [Found: C, 34.0; N, 5.7. $(C_{14}F_{14}N_2O_2)_n$ requires C, 34.0; N, 5.7%], M.P. 129° C. (sintered 112° C., decomposed 142° C.).

Example 10

Pentafluoronitrosobenzene (5.0 g., 25.4 millimole), tetrafluoroethylene (10.10 g., 101 millimole), and methylene chloride (50 ml.) were kept in a stainless steel autoclave (200 ml.) at 20° C. for 30 min. The autoclave was then plunged into an oil bath which had been preheated to 150° C. The temperature of the bath fell to 129° C., where it was maintained for a further 30 min. The maximum pressure reached during the reaction was 25 atm. The autoclave was removed and cooled in a bath at −10°, and the unreacted tetrafluoroethylene was removed. The residual brown solution was poured into methanol (500 ml.), when a 1:1 copolymer of pentafluoronitrosobenzene and tetrafluoroethylene (2.4 g., 32%) [Found: C, 32.4. $(C_8F_9NO)_n$ requires C, 32.3%], M.P. 80–102° C., precipitated. The methanol and methylene chloride were evaporated, to leave a brown solid (3.60 g., 48%), identified by infrared spectroscopy as an impure copolymer.

Example 11.—Copolymer of pentafluoronitrosobenzene and chlorotrifluoroethylene Pentafluoronitrosobenzene (3.29 g., 16.8 millimole), chlorotrifluoroethylene (5.94 g., 57 millimole), and methylene chloride (25 ml.) were kept in a 300 ml. sealed Pyrex tube at 20° C. for 16 hr. (calculated initial pressure 4.8 atmospheres). Unreacted chlorotrifluoroethylene (3.84 g.) was removed, and the volume of the residual pale yellow solution was reduced by distillation to 10 ml. This was then poured into methanol (100 ml.) and the precipitated solid was dried and identified as a 1:1 copolymer of pentafluoronitrosobenzene and chlorotrifluoroethylene (3.97 g., 76%) [Found: C, 30.7; N, 4.6.

$$(C_8ClF_8NO)_n$$

requires C, 30.6; N, 4.5%].

The methylene chloride and methanol were evaporated to dryness and left a pale yellow residue (0.65 g.), whose infrared spectrum was similar to that of the original polymer.

Example 12

Pentafluoronitrosobenzene (1.00 g., 5.07 millimole), chlorotrifluoroethylene (0.295 g., 2.54 millimole), and methylene chloride (5 ml.), were kept in a 66 ml. sealed Pyrex tube at 20° C. for 24 hours (calculated initial pressure ca. 1 atm.). No chlorotrifluoroethylene remained after this period, and a polymer was precipitated from the methylene chloride by the addition of methanol (50 ml.). The polymer was identified by infrared spectroscopy as a copolymer of pentafluoronitrosobenzene and chlorotrifluoroethylene (0.614 g., 47%) [Found: C, 32.0. 1:1 copolymer requires C, 30.6; 2:1 copolymer requires C, 32.8%]. The methylene chloride and methanol were evaporated to leave a brown residue (0.244 g.), whose infrared spectrum was almost identical with that of the above polymer.

Example 13.—Copolymer of pentafluoronitrosobenzene and 1,1-dichlorodifluoroethylene Pentafluoronitrosobenzene (1.00 g., 5.07 millimole), 1,1-dichlorodifluoroethylene (2.07 g., 15.6 millimole), and methylene chloride (5 ml.) were kept in a 52 ml. sealed Pyrex tube at 20° C. for 15 hr. (calculated initial pressure ca. 7.5 atm.). Unreacted dichlorodifluoroethylene was removed, and the residual liquid and gel-like deposit were poured into methanol (50 ml.). The resulting solid was a 1:1 copolymer of pentafluoronitrosobenzene and 1,1-dichlorodifluoroethylene (0.267 g., 16%) [Found: C, 29.2. $(C_8Cl_2F_7NO)_n$ requires C, 29.1%]. The methylene chloride and methanol were evaporated to dryness to leave a yellow residue (1.12 g.), whose infrared spectrum was almost identical with that of the above polymer.

Example 14

Pentafluoronitrosobenzene (1.00 g., 5.07 millimole), 1,1-dichlorodifluoroethylene (0.338 g., 2.54 millimole), and methylene chloride (5 ml.) were kept in a 66 ml. sealed Pyrex tube at 20° C. for 16 hours (calculated initial pressure ca. 1 atm.). The resulting mixture was poured into methanol (50 ml.), and the resulting precipitate (0.242 g.) was filtered off and refluxed for 5 min. with methylene chloride. A 1:1 copolymer of pentafluoronitrosobenzene and 1,1-dichlorodifluoroethylene (0.15 g., 11%) [Found: C, 28.1. $(C_8Cl_2F_7NO)_n$ requires C, 29.1%] was thus obtained. The infrared spectrum was identical with that of the polymer obtained in Example 13. The methylene chloride and methanol were evaporated and left a stickly brown unidentified residue (0.64 g.).

The polymers provided by the invention have various applications, depending on their particular properties. Thus, certain of the polymers have a high resistance to solvents and will be used for appropriate application where solvent resistance is desired. They are also useful in applications requiring elastomeric and flexible solid materials, particularly when solvent-resistance and/or good low temperature characteristics are necessary. For example, they can be used in making gaskets, hoses and protective sheeting. When formed into their films they are particularly valuable as transparent, anti-corrosion coatings on metals, glass, wood, etc.

It will be understood that numerous changes and variations may be made from the above invention without departing from the spirit and scope of the invention.

We claim:
1. Copolymers having the structure

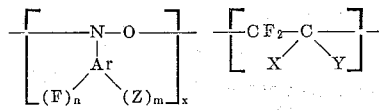

where Ar is an aryl radical selected from the group of phenyl and naphthyl, Z is selected from the group consisting of hydrogen, chlorine, methyl and perfluoromethyl, $(m+n+1)$ represent an integer corresponding to the valence of Ar, n is an integer of at least 3, X is selected from the group consisting of fluorine, chlorine and hydrogen, and Y is selected from the group consisting of fluorine, chlorinne, hydrogen, polyfluoroalkyl and polyfluoroaryl, and x is an integer from one to two.

2. A copolymer having repeating units of the structure

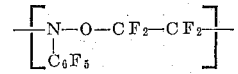

3. A copolymer having repeating units of the structure

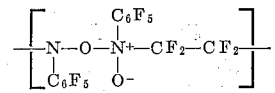

4. A copolymer having repeating units of structure

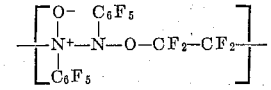

5. A copolymer as in claim 1 wherein Ar is phenyl, n is 5, and X and Y are chlorine.

6. A copolymer as in claim 1 wherein Ar is phenyl, n is 5, X is fluorine and Y is chlorine.

7. The process of preparing the copolymer of claim 1 which comprises reacting a polyfluoroarylnitroso compound of structure

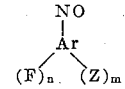

where Ar is an aryl radical selected from the group of phenyl and naphthyl, Z is selected from the group consisting of hydrogen, chlorine, methyl and perfluoromethyl, $(m+n+1)$ represent an integer corresponding to the value of Ar, and n is an integer of at least 3, with a fluorinated olefin of structure $CF_2=CXY$ where X is selected from the group consisting of fluorine, chlorine and hydrogen, and Y is selected from the group consisting of fluorine, chlorine, hydrogen, polyfluoroalkyl and polyfluoroaryl, said process being carried out at a temperature between about —50° C. and 200° C. and in a liquid chlorinated hydrocarbon as a solvent for the reactants.

8. The process of claim 7 wherein the reactants are pentafluoronitrosobenzene and tetrafluoroethylene.

9. The process of claim 7 wherein the reactants are pentafluoronitrosobenzene and fluorotrichloroethylene.

10. The proces of claim 7 where in the reactants are pentafluoronitrosobenzene and 1,1-dichlorodifluoroethylene.

No references cited.

JOSEPH L. SCHOFER, Primary Examiner.

M. L. BERCH, Assistant Examiner.